(12) United States Patent
Wilson

(10) Patent No.: US 6,244,609 B1
(45) Date of Patent: Jun. 12, 2001

(54) FRONT WHEEL SUSPENSION FORK FOR TWO WHEELED VEHICLES AND METHOD

(76) Inventor: Jeff Wilson, 6510 Madeleine, San Antonio, TX (US) 78229

( * ) Notice: Subject to any disclaimer, the term of this patent is extended or adjusted under 35 U.S.C. 154(b) by 0 days.

(21) Appl. No.: 09/123,789

(22) Filed: Jul. 28, 1998

(51) Int. Cl.$^7$ .................................. B62K 1/00; F16F 9/00
(52) U.S. Cl. ............................................ 280/276; 188/312
(58) Field of Search .................................... 188/297, 312; 267/34, 195, 217, 225, 226, 286, 291; 280/200, 276, 263, 270, 274, 279, 280

(56) References Cited

U.S. PATENT DOCUMENTS

| 2,475,774 | 7/1949 | Benson . | |
|---|---|---|---|
| 4,511,156 | 4/1985 | Offenstadt . | |
| 4,561,669 | 12/1985 | Simons . | |
| 4,778,216 | * 10/1988 | Stupakis | ................................ 297/17 |
| 5,209,138 | 5/1993 | Shu . | |
| 5,377,942 | * 1/1995 | Knopp | .................................. 248/161 |
| 5,398,954 | 3/1995 | Chonan . | |
| 5,427,347 | 6/1995 | Chonan . | |
| 5,478,099 | 12/1995 | Kawahara . | |
| 5,725,226 | * 3/1998 | Cabrerizo-Pariente | .............. 280/276 |

* cited by examiner

Primary Examiner—Christopher P. Schwartz
Assistant Examiner—C. T. Bartz
(74) Attorney, Agent, or Firm—Gunn, Lee & Keeling

(57) ABSTRACT

The present invention is a motorcycle suspension fork that combines a presently available conventional suspension with a presently available inverted suspension. The suspension of the present invention has two telescoping segments, with each segment capable of moving independently from the other. This design allows one segment to compress to absorb a shock while allowing the other segment to expand in preparation of absorbing another shock, thus allowing better shock absorption and a more comfortable ride.

9 Claims, 4 Drawing Sheets

FRONT WHEEL SUSPENSION FORK FOR TWO WHEELED VEHICLES AND METHOD

BACKGROUND OF THE INVENTION

1. Field of the Invention

Applicant's invention relates to suspension systems and, more specifically, to a novel front wheel suspension fork for motorcycles or bicycles.

2. Background Information

Presently, motorcycle suspensions are of two general types called the conventional type or the inverted type. Conventional type suspensions consist of a damping mechanism—for example, a combination spring, rod, and hydraulic assembly—encased in two hollow cylinders that telescope into each other. The two hollow cylinders are of different diameters so that one cylinder telescopes snugly into the other. The primary damping mechanism—the receiving tube and valving assembly—is placed in the cylinder with the larger diameter and is located at the bottom of the suspension so that shocks transferred from the wheel to the suspension can be immediately damped before traveling to the hands of the rider. Any remaining compression force not absorbed by the damping mechanism are transmitted through the rod to the hands of the rider. In actual practice, conventional suspensions are suited for absorbing small bumps and tend to bottom out on large bumps. Furthermore, these conventional suspensions tend to deform under large stresses, causing the entire suspension to flex, thus decreasing its efficiency to absorb shocks. Inverted suspensions also consist of a damping mechanism encased into two hollow cylinders. As with conventional suspensions, the primary damping mechanism is located in the lower cylinder. However, unlike the conventional suspension, this lower cylinder is the cylinder with the smaller diameter. In fact, an observer can easily distinguish a conventional suspension from an inverted suspension because, in a conventional suspension, the cylinder having the larger diameter is attached to the wheel axis while in an inverted suspension, the cylinder having the smaller diameter is attached to the wheel axis. This configuration-one with the cylinder having a smaller diameter at the bottom and the cylinder having a larger diameter at the top causes the suspension to be rigid and stiff due to the increased length and increased stiffness of the upper cylinder. This increased rigidity solves the deformation problem encountered in conventional forks. In practice, the inverted suspension design is not ideal because it can only damp out large bumps while allowing smaller vibrations to travel from the wheel to the rider's hands, making the ride uncomfortable.

The damping mechanism in today's shock absorbers comprises a rod and a receiving tube—i.e., one telescoping part—along with two hydraulic valving assemblies. One hydraulic valving assembly—the upper hydraulic valving assembly—is located on the portion of the rod permanently located inside the receiving tube. The other hydraulic valving assembly—the lower hydraulic valving assembly—is located near the bottom and inside of the receiving tube. Small orifices are located near the bottom of the receiving tube, just below the lower hydraulic valving assembly.

The entire damping mechanism, along with a coil spring encircled around the damping mechanism, is attached to and placed inside of the hollow cylinders and partially immersed with hydraulic fluid. The coil spring is also attached to the hollow cylinders. Through the small orifices, the hydraulic fluid seeps into the receiving tube, completely filling the inner cavity of the receiving tube.

When a compression force is applied to the damping mechanism, the receiving tube is forced into the rod; the mass of the rod displaces the hydraulic fluid from the inner cavity of the receiving tube; and the hydraulic fluid flows past both the upper and the lower hydraulic valving assemblies, with the portion flowing past the lower hydraulic valving assembly being expelled out of the receiving tube through the orifices at the bottom of the receiving tube. Both the top and the bottom hydraulic valving assemblies control the speed by which the hydraulic fluid pass through them, thereby controlling the damping rate.

As the external force pushes the receiving tube into the rod, the coil spring is also compressed. When the external force can push the receiving tube into the rod no further, the spring coil returns the rod and receiving tube back to their rest positions. As the rod exits the receiving tube, hydraulic fluid can either pass though the upper hydraulic valving assembly or can enter through the orifices and pass through the lower hydraulic valving assembly and refill the inner cavity of the receiving tube. The suspension is now ready to damp another road bump.

While the above described damping mechanism—i.e. one with a single telescoping part—works well against an individual compression force, it gradually loses its effect when damping compression forces of different magnitudes occurring in quick succession of each other. Because the spring may not have time to return the receiving tube to its rest position before another compression force pushes the receiving tube further into the rod, the above described damping mechanism tends to lose its effect and may even bottom out when damping rapidly successive compressions. This problem becomes especially pronounced when the mechanism must damp out both small and large compression forces in quick succession of each other.

Some motorcycle riders ride their motorcycles strictly on well paved roads where bumps are typically small and separated by lengthy stretches of road, and thus the suspension systems presently available readily satisfy their needs. However, other riders—especially dirt bike riders—tend to encounter both large and small bumps in rapid succession of each other. With today's shock absorbers, which are specifically designed to absorb either large bumps or small bumps but not both, dirt bike riders must choose to either endure small vibrations throughout the entire ride or risk bottoming out the motorcycle suspension when going over large bumps. Furthermore, today's shock absorbers work poorly when damping bumps that occur in quick succession of each other. Inventors have tried to solve the above problem without success.

U.S. Pat. No. 2,475,774 to Benson discloses an inverted suspension that uses both a light spring and a heavy spring to absorb shocks. The light spring is attached to the heavy spring and together they form the primary damping mechanism of this invention. The light spring is to be used to damp small shocks, while the heavy spring is to be used to damp large shocks. However, only one telescoping rod and one receiving tube—i.e. one telescoping part—is used for this invention. Thus, although this invention may be able to absorb both large and small shocks, it is not effective when such shocks come in quick succession of each other.

U.S. Pat. No. 4,511,156 to Offenstadt discloses of a motorcycle suspension system having an anti-skid breaking mechanism. Because this invention uses a shock absorbing mechanism having only one telescoping part, it cannot adequately absorb shocks that arrive in quick succession of each other or damp out both small and large shocks.

U.S. Pat. No. 4,561,669 to Simons discloses another inverted suspension. This invention provides a lightweight, highly rigid fork with low friction, high quality damping characteristics and no axle overhang. One spring is found throughout the entire inner length of the suspension. However, since damping is still achieved with one telescoping part, this invention cannot adequately absorb both large and small shocks, whether or not they appear in quick succession of each other.

U.S. Pat. No. 5,209,138 to Shu discloses a handlebar assembly for bicycles. This invention prevents the rod from rotating relative to the shank, thereby allowing only up and down motion and preventing any twisting motion. Again, this invention has only one telescoping part and therefore is not able to absorb shocks that come in quick succession of each other.

U.S. Pat. No. 5,398,954 to Chonan discloses a wheel suspension type front fork and a method of manufacturing the same. The advantage of this invention over the prior art is that this invention can be manufactured without a metal mold and cutting work. This invention does not provide a method for absorbing both large and small shocks.

U.S. Pat. No. 5,427,397 is again issued to Chonan. This patent discloses a wheel suspension type front fork that eliminates the need of a rebound absorption mechanism by securing the upper end of the spring coil to the lower end of the receiving tube and the lower end of the spring coil to the upper end of the sliding tube (the tube enclosing the spring), thereby preventing the receiving tube, the spring coil, and the sliding tube from springing apart from the rebounding force of the compressed spring coil. This invention uses conventional shock absorbers having only one telescoping part and therefore is not designed to absorb both large and small shocks.

U.S. Pat. No. 5,478,099 issued to Kawahara discloses a bicycle wheel fork assembly that telescopes from one side only. The advantage of this invention over other front fork assemblies is that the stiffness of the shocks in both the contraction and the expansion parts of the shock absorption cycle can be adjusted by placing a contraction adjuster on one fork, an expansion adjuster on the other fork, and a cross member that connecting the two forks. Although this invention allows the stiffness of the shocks to be adjusted and thus allows better shock absorption, it does not allow both large and small shocks to be absorbed at the same time. Furthermore, since this invention uses a damping mechanism that telescopes from one side only, it also cannot satisfactorily absorb shocks that come in quick succession of each other. Thus, this invention does not provide an adequate solution to the present problem.

SUMMARY OF THE INVENTION

It is an object of the present invention to provide a novel apparatus and method for a motorcycle or bicycle front wheel suspension system that can absorb both large and small road bumps.

It is a further object of the present invention to provide a shock absorber that can absorb both small and large bumps that come in quick succession of each other.

It is another object of the present invention to provide a novel suspension system that can easily replace any existing suspension system.

In satisfaction of these and related objectives, Applicant's present invention provides a mechanism and method for motorcycle riders to ride comfortably over small and large successive bumps without experiencing excessive vibrations and without having to worry about excessive flexing of the suspension fork. Applicant's invention, the Front Wheel Suspension Fork and Method, is installed in place of a presently available suspension system in the front portion of a motorcycle. A rider can easily replace a conventional or inverted suspension with Applicant's invention without the need to purchase additional equipment because the present invention is of similar size and weight as presently available suspensions.

The present invention consists of two suspensions, one mounted on each side of the front wheel. The suspensions are connected to each other by a triple clamp. In addition to connecting the two suspensions, the triple clamp also secures the steering stem to the two suspensions. The suspensions, the triple clamp, and the steering stem form what is typically called a suspension fork. In addition to attaching the steering stem to the two suspensions to form the suspension fork, the triple clamp also secures the suspension fork to the motorcycle frame.

The two suspensions mounted on either side of the front wheel are mirror images of each other. For ease of description, only one suspension will be described below. The suspension forming a part of the present invention consists of an upper telescoping cylinder, a center cylinder, and a lower telescoping cylinder. The upper and lower telescoping cylinders can both freely and independently telescope into the center cylinder.

The upper telescoping cylinder and the lower telescoping cylinder are slidably connected to the center cylinder through a series of low friction bearings, clamps, and seals. These bearings, clamps, and seals provide a means for the three cylinders to smoothly slide into and out of one another, prevent the outside dust from entering into the inner part of the suspension, and prevent the hydraulic fluid inside the suspension from leaking out.

Turning to the inner construction of the suspension assembly, both the upper telescoping cylinder and the lower telescoping cylinder are attached to upper and lower end blocks, respectively, at the ends farthest from the center cylinder. A center plate is fixedly attached to the inner circumference of the center cylinder, at the center cylinder's midpoint, thus dividing the suspension into two equally spaced and independent sections. Each independent section is partially filled with hydraulic fluid.

A coil spring—the upper coil spring—is placed inside the upper section. Upper coil spring extends throughout the entire length of the upper section.

The upper coil spring surrounds the upper rod and the upper receiving tube. The upper rod has a first end and a second end, and the upper receiving tube has a first end and a second end. The first end of the upper rod is detachably attached to the upper end block in and the second end of the upper rod is telescopically attached to the first end of the receiving tube. The second end of the receiving tube is detachably attached to the center plate. The upper coil spring abuts against the upper end block and the center plate at either end.

A first hydraulic valving assembly is fixedly attached to the second end of the upper rod located inside the receiving tube. A second hydraulic valving assembly is located at the second end of the receiving tube, at an end opposite to the first hydraulic valving assembly. This second hydraulic valving assembly is attached to a short rod which is, in turn, attached to the bottom end of the upper receiving tube. Additionally, a number of orifices are located near the bottom of the receiving tube, generally below the second hydraulic valving assembly. The inner cavity of the receiving tube is filled with hydraulic fluid.

The lower section of the suspension houses the lower coil spring, the lower rod, and the lower receiving tube. All three are generally similar in construction and assembly as their counterparts located in the upper section. One hydraulic valving assembly is attached to the lower rod and another hydraulic valving assembly is attached to the lower receiving tube in the same manner and in the same location as in the upper section.

As an external compression force is applied to the suspension, the lower section is first used to damp the compression force. If the lower section is unable to completely damp out the compression force, then the remainder of the force is transmitted to the upper section, to be damped out by the upper section.

Since the method used by the upper and lower sections to damp out a compression force is the same, only the damping cycle of the upper section will be described below.

When a compression force is applied to the upper damping mechanism, the upper receiving tube is forced into the upper rod; the mass of the upper rod displaces the hydraulic fluid from the inner cavity of the upper receiving tube; and the hydraulic fluid flows past both the first and the second hydraulic valving assemblies, with the portion flowing past the lower hydraulic valving assembly being expelled out of the receiving tube through the orifices at the bottom of the receiving tube. Both the first and the second hydraulic valving assemblies control the speed by which the hydraulic fluid can pass through them, thereby controlling the damping rate.

As the external force pushes the upper receiving tube into the upper rod, the upper coil spring is also compressed. When the external force can push the upper receiving tube into the upper rod no further, the upper spring coil returns the upper rod and upper receiving tube back to their rest positions. As the upper rod exits the upper receiving tube, hydraulic fluid can either pass through the first hydraulic valving assembly or can enter through the orifices and pass through the second hydraulic valving assembly, and refill the inner cavity of the upper receiving tube. The upper section is now ready to damp another road bump.

When fully compressed, the edge of the upper telescoping cylinder meets the edge of the lower telescoping cylinder, obscuring the entire center cylinder from view. Internally, the upper rod fully recedes into the upper receiving tube and the lower rod fully recedes into the lower receiving tube. The coil springs are at their maximum compression.

The above description uses a spring, rod and hydraulic valving assembly to damp shocks. However, it is important to note that the novel aspect of the present invention rests on the fact that the present invention has two independently telescoping segments that are used to absorb both large and small shocks. Thus, the actual internal damping mechanism used to achieve this double telescoping action is unimportant—that is, any conventional damping mechanism, such as spring and rod, hydraulic, or combination spring and rod and hydraulic, can be used as the internal damping mechanism for the present invention.

Although the present invention was designed to be used on motorcycles, this invention can easily be adapted to any kind of two-wheeled vehicle including but not limited to mountain bikes.

DETAILED DESCRIPTION OF THE PREFERRED EMBODIMENT

Figure 1:
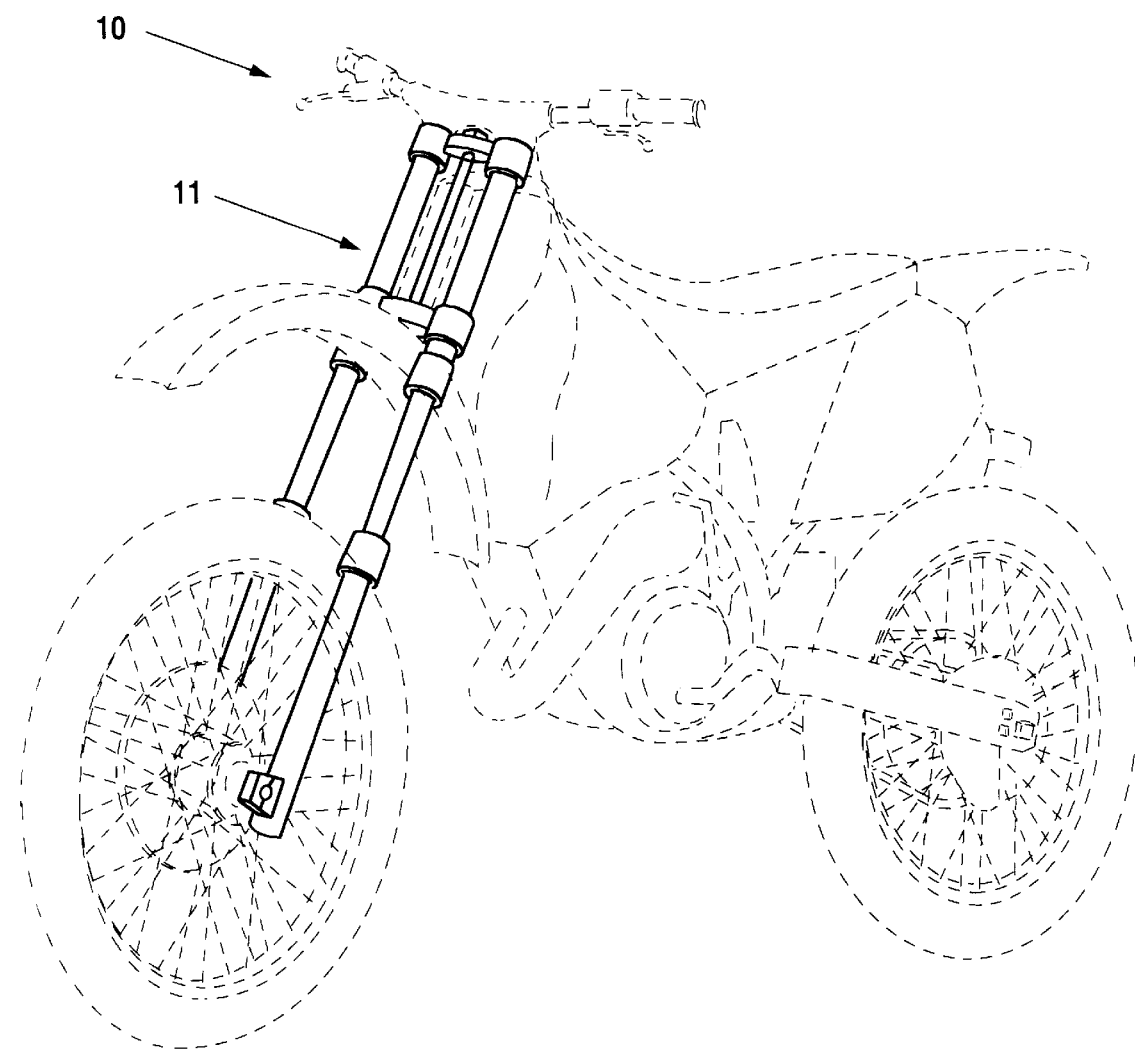
FIG. 1 is a perspective view of a motorcycle incorporating the present invention.
Figure 2:
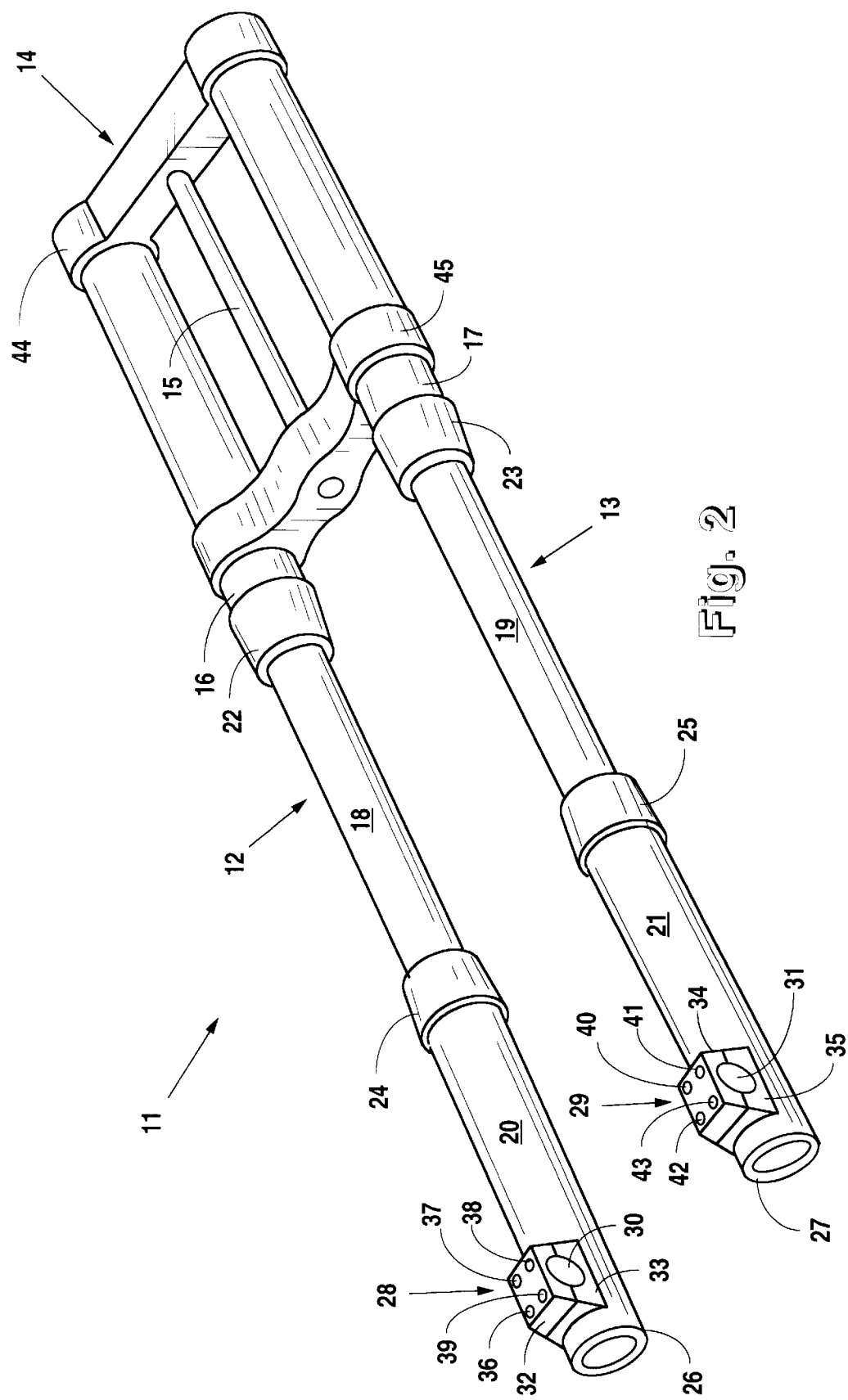
FIG. 2 is an enlarged perspective view of the preferred embodiment of the present invention shown separately from the motorcycle.

Referring to FIG. 1, the preferred embodiment of the present invention is shown attached to the front end of motorcycle 10. The present invention is of generally the same dimensions as suspension forks presently available in the marketplace, thus the present invention can easily replace existing suspension forks without having to make any major modifications to the motorcycle. FIG. 2 shows front wheel suspension fork 11 in greater detail. Front wheel suspension fork 11 comprises left suspension 12, right suspension 13, triple clamp 14, and steering stem 15, all of which will be described in further detail below.

Both left suspension 12 and right suspension 13 generally consist of a series of hollow cylinders linked together in a telescoping fashion. Left and right suspensions 12 and 13, respectively, can be further subdivided into left and right upper telescoping cylinders 16 and 17, respectively; left and right center cylinders 18 and 19, respectively; and left and right lower telescoping cylinders 20 and 21, respectively. Left and right upper telescoping cylinders 16 and 17, respectively, are generally of the same length with respect to each other and with respect to left and right lower telescoping cylinders 20 and 21, respectively. To allow the hollow cylinders to link together in a telescoping fashion, the inside diameter of left and right upper telescoping cylinders 16 and 17, respectively, are slightly larger than the outside diameters of left and right center cylinders 18 and 19, respectively. Likewise, the inside diameters of left and right lower telescoping cylinders 20 and 21, respectively, are also slightly larger than the outside diameters of left and right center cylinders 18 and 19, respectively. In addition, in order to easily telescope into the larger cylinders, left and right center cylinders 18 and 19, respectively, both have smooth outer surfaces. Finally, the telescoping actions of the cylinders require all cylinders to be generally straight.

Left and right upper telescoping cylinders 16 and 17, respectively, terminate into telescoping clamps 22 and 23, respectively, at the connecting point between left and right upper telescoping cylinder 16 and 17, respectively, and left and right center cylinders 18 and 19, respectively; left and right lower telescoping cylinders 20 and 21, respectively, terminate into telescoping clamps 24 and 25, respectively, at the connecting point between left and right lower telescoping cylinders 20 and 21, respectively, and left and right center cylinders 18 and 19, respectively. The specific manner in which the above telescoping clamps are connected to left and right center cylinders 18 and 19, respectively, will be discussed below in conjunction with FIG. 3. Although, in the preferred embodiment, all of the above telescoping cylinders are made of metal, they can be made of any material strong enough to resist the physical forces experienced by a typical suspension fork.

Left lower telescoping cylinder 20 has lower edge 26; right lower telescoping cylinder 21 has lower edge 27. Left axle clamp 28 is attached a certain distance from lower edge 26 of left lower cylinder 20; right axle clamp 29 is attached a certain distance from lower edge 27 of right lower cylinder 21. Although left and right axle clamps 28 and 29, respectively, can be located at any distance from lower edges 26 and 27, respectively, of their respective lower telescoping cylinders, once the distance between one axle clamp is fixed with respect to one lower edge, the other clamp must be fixed at the same distance from its lower edge.

In the preferred embodiment, both left axle clamp 28 and right axle clamp 29 are attached generally perpendicularly to their respective lower telescoping cylinders. Left axle clamp 28 can be divided into upper half 32 and lower half 33, with lower half 33 being fixedly attached to left lower telescoping cylinder 20. Right axle clamp 29 can be divided into upper half 34 and lower half 35, with lower half 35 being fixedly attached to right lower telescoping cylinder 21. Upper half 32 of left axle clamp 28 is removably attached to lower half 33 by bolts 36, 37, 38, and 39. Upper half 34 of right axle clamp 29 is removably attached to lower half 35 by bolts 40, 41, 42, and 43.

Each axle clamp contains a generally circular hole drilled through its entire length in a direction perpendicular to the lengthwise axis of left and right suspension units 12 and 13. Hole 30, located in left axle clamp 29, is bisected by the dividing line between upper half 32 and lower half 33. Hole 31, located in right axle clamp 30, is bisected by the dividing line between upper half 34 and lower half 35. Holes 30 and 31 must be adequately large enough to allow the front wheel axis of motorcycle 10 to be clamped to left and right axle clamp 28 and 29, respectively. Although, in the preferred embodiment, left and right axle clamps 28 and 29, respectively, are attached generally perpendicularly to left and right lower telescoping cylinders 20 and 21, respectively, left and right axle clamps 28 and 29, respectively, can be attached to lower telescoping cylinders 20 and 21 in any manner, in any orientation, and be formed in any shape known to those skilled in the art of motorcycle suspension forks.

Triple clamp 14 secures left suspension 12 to right suspension 13 in a parallel and apart fashion. Triple clamp 14 consists of upper clamp 44 and lower clamp 45, with each having three clamping members located at the right side, the left side, and in the center of triple clamp 14. In addition to clamping left and right suspension units 12 and 13 to each other, triple clamp 14 also attaches steering stem 15 in a parallel and apart fashion to left and right suspension units 12 and 13, respectively. Steering stem 15 is then attached to the body of motorcycle 10.

Triple clamp 14 is located on the upper part of left and right suspensions 12 and 13, respectively. Upper clamp 44 is located at or near the upper edges of left and right telescoping cylinders 12 and 13, respectively, with its clamping members securely holding upper telescoping cylinder 16, upper telescoping cylinder 18, and the upper portion of steering stem 15 in a parallel and apart fashion. Lower clamp 45 is located separate and apart from upper clamp 44, generally at or near the lower tip of steering stem 15. Lower clamp 45 also secures left and right upper telescoping cylinders 16 and 17, respectively, and steering stem 15 to each other in a parallel and apart fashion. Triple clamp 14 must be located somewhere on left and right upper telescoping cylinder 16 and 17, respectively. No part of triple clamp 14 may be located on left and right center cylinder 18 and 19, respectively, or left and right lower telescoping cylinder 18 and 19, respectively.

Figure 3:
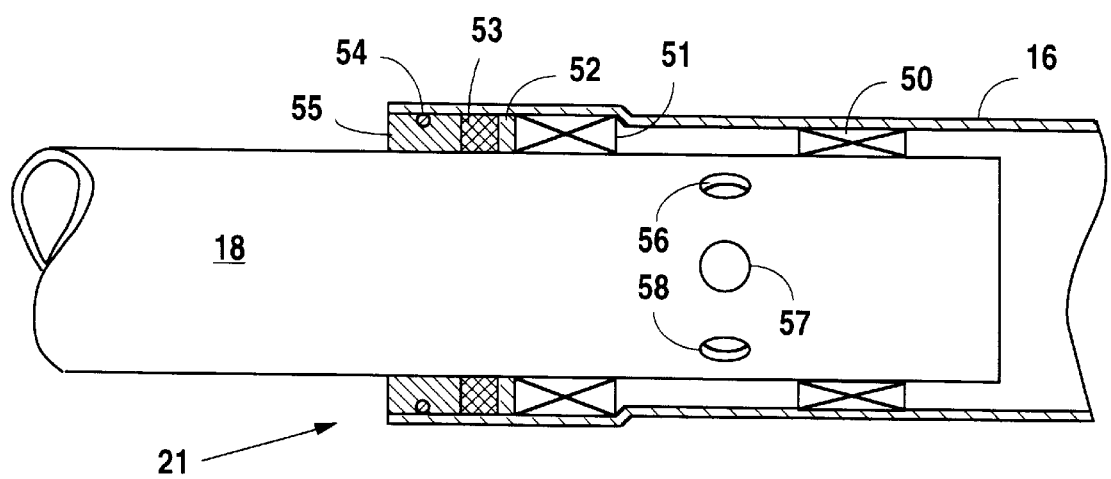
FIG. 3 is a cross section view of the telescoping mechanism between the center cylinder and the upper telescoping cylinder.

FIG. 3 shows a cross section view of telescoping clamp 22. Although only telescoping clamp 22 is shown, it should be understood that the mechanical parts contained in telescoping clamps 22, 23, 24, and 25 are the same. Left telescoping clamp 22 is actually an extension of left upper telescoping cylinder 16. Near the edge of left upper telescoping cylinder 16, the cylinder suddenly flares out to form an annulus with a larger diameter. This larger diameter formed by the annulus is part of the left telescoping clamp 22.

Telescoping clamp 22 consists essentially of movable bearing 51, washer 52, oil seal 53, stopper ring 54, and dust seal 55. Although not a part of telescoping clamp 22, fixed bearing 50 and orifices 56, 57, and 58 form an essential part of the telescoping mechanism. Fixed bearing 50 is fixedly attached close to the tip of left center cylinder 18. Fixed bearing 50 is a metal ring of a certain thickness and a certain length—in the preferred embodiment, the length is greater than the thickness—and is coated with a low friction material such as Teflon® on its outside surface where it comes into contact with the inner wall of left upper telescoping cylinder 16. This low friction material allows left center cylinder 18 to smoothly telescope into and out of left upper telescoping cylinder 16.

Orifices 56, 57, and 58 are located on left center cylinder 18, between fixed bearing 50 and movable bearing 51. Orifices 56, 57, and 58 allow air or hydraulic fluid to freely flow from the inside chamber of left upper telescoping cylinder 16 to the inside chamber of left center cylinder 18 so that the air pressure between the chambers can be equalized and the hydraulic fluid inside left upper telescoping cylinder 16 and inside left center cylinder 18 are at the same level.

Movable bearing 51 is located behind fixed bearing 50 and inside telescoping clamp 22, but is not fixedly attached to either left center cylinder 18 or telescoping clamp 22. Movable bearing 51 has a certain thickness and a certain length. In the preferred embodiment, the length of movable bearing 57 exceeds its thickness. The outside diameter of movable bearing 51 is slightly larger than the outside diameter of fixed bearing 50 and the inside diameter of left upper telescoping cylinder 16, but is slightly smaller than the inside diameter of telescoping clamp 22. Thus, movable bearing 51 can slide into telescoping clamp 22 but cannot slide further into left upper telescoping cylinder 16. Also, when fixed bearing 50 is placed next to movable bearing 51, fixed bearing 50 will abut against but can never slide past movable bearing 51, thus preventing left center cylinder 18 from being completely pulled out of left upper telescoping cylinder 16. Finally, the inside diameter of movable bearing 51 is coated with a low friction material such as Teflon® to allow it to smoothly slide past left center cylinder 18.

Washer 52 is located inside telescoping clamp 22, immediately behind but not attached to movable bearing 51. Washer 52 is also not fixedly attached to left center cylinder 18 or telescoping clamp 22. Washer 52 divides movable bearing 51 from oil seal 53. In the preferred embodiment, washer 52 is made of a metallic material and is commercially available.

Oil seal 53 is located inside telescoping clamp 22, immediately behind but not fixedly attached to washer 52. Further, oil seal 53 is not fixedly attached to left center cylinder 19 or telescoping clamp 22. Instead, oil seal 53 can freely slide along the inside diameter of left center cylinder 18. Oil seal 53 prevents any hydraulic fluid from leaking to the outside environment. Oil seal 53 can be made of any flexible material such as rubber and is commercially available.

Both dust seal 55 and stopper ring 54 are located behind oil seal 53. Stopper ring 54 is a metallic ring with small inwardly protruding "c" shaped bends throughout its structure and is commercially available. The outside diameter of stopper ring 54 rests against the inside diameter of telescoping clamp 22 while the inside diameter of stopper ring 54 rests against the outside diameter of dust seal 55. This configuration allows stopper ring 54 to secure dust seal 55 to telescoping clamp 22.

Dust seal 55 rests against oil seal 53 at one end and completely covers the opening between the edge of telescoping cylinder 22 and left center cylinder 18, thus preventing dust from entering the inside of left suspension unit 12. Dust seal 55 can be made with any flexible material such as rubber and is commercially available. It is important for dust seal 55 to fit snugly over left center cylinder 18 yet be loose enough to allow left center cylinder 18 to freely telescope into and out of left upper telescoping cylinder 16.

Figure 4:
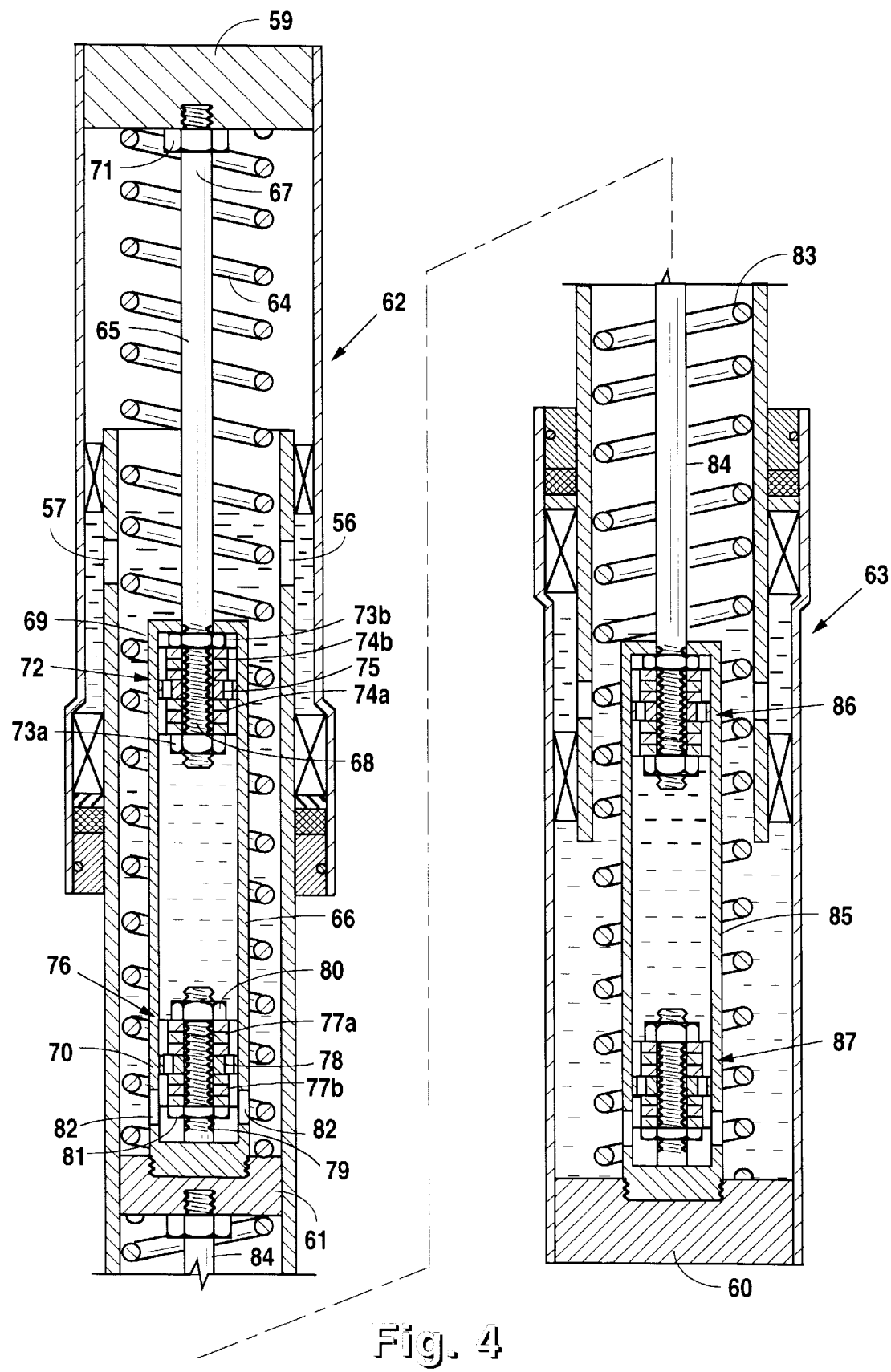
FIG. 4 is a broken cross sectional view of the preferred embodiment of the present invention in its normal rest position.

FIG. 4 shows a cross section of left suspension 11. No illustration or detailed description of right suspension 12 is shown or will be described below because the suspensions are identical and, in fact, interchangeable. Any person skilled in the art of motorcycle shocks will be able to construct a right suspension by looking at FIG. 4 and reading the description below.

The outer components of left suspension 12 have three major parts: left upper telescoping cylinder 16, left center cylinder 18, and left lower telescoping cylinder 20. The inside diameter of left upper telescoping cylinder 16 is the same as the inside diameter of left lower telescoping cylinder 20. The outside diameter of left center cylinder 18 is slightly smaller than the inside diameter of both left upper telescoping cylinder 16 and left lower telescoping cylinder 20 so that the three outer components of left suspension 12 can be telescopically attached to each other. When properly assembled, the edge of left upper telescoping cylinder 16 overlaps the edge of left center cylinder 18 for a certain distance. Likewise, the edge of left lower telescoping cylinder 20 overlaps the edge of left center cylinder 18 for a certain distance.

Left upper telescoping cylinder 16 has upper end block 59; left lower telescoping cylinder has lower end block 60. Both upper end block 59 and lower end block 60 are generally circular plates. Upper end block 59 is located at the non-telescoping end of left upper telescoping cylinder 16 while lower end block 60 is located at the non-telescoping end of left lower telescoping cylinder 20. Both upper and lower end blocks 59 and 60, respectively, are removably attached to left upper and lower telescoping cylinders 16 and 20, respectively.

Center plate 61, a generally circular plate, is fixedly attached to the inner circumference of left center cylinder 18, at generally the midpoint of left center cylinder 18. Thus, the damping mechanism of left suspension 12 is divided into two generally equally spaced and independent sections-upper section 62 and lower section 63.

Upper section 62 houses upper coil spring 64, upper rod 65, and upper receiving tube 66. Upper coil spring 64 is located inside left center cylinder 18 and extends throughout the entire length of upper section 62. Upper coil spring 64 abuts against center plate 61 at one end and against upper end block 59 at the other end.

Upper rod 65 and upper receiving tube 66 are enclosed within the coils of upper coil spring 64. In the preferred embodiment, upper rod 65 is made of metal. However, upper rod 65 can be made of any material that can withstand forces typically associated with motorcycle suspensions. Upper rod 65 has a first end 67 and a second end 68.

Upper receiving tube 66 is a hollow cylinder with a first end 69 and a second end 70. First end 69 is open to receive upper rod 65 while second end 70 is closed. Although, in the preferred embodiment, upper receiving tube 66 is made of metal, it can be made of any material that can withstand forces typically associated with motorcycle suspensions. Upper rod 65 is telescopically attached to upper receiving tube 66 such that a portion of second end 68 of upper rod 65 is permanently located inside of upper receiving tube 66.

First end 67 of upper rod 65 is threadedly attached to upper end block 59 and secured to upper end block 59 by nut 71. Second end 68 of upper rod 65, as previously stated, is located permanently within the inner cavity of upper receiving tube 66. First hydraulic valving assembly 72 is detachably attached to second end 68 of upper rod 65 and secured to second end 68 with nuts 73a and 73b.

First hydraulic valving assembly 72 generally consists of a first and second series of extremely thin washers and springs 74a and 74b attached on either side of a first metallic ring 75 having a certain thickness and a plurality of holes (not shown) drilled through it. The above described hydraulic valving assembly are familiar to those skilled in the art of motorcycle suspension forks and are readily available in the marketplace.

Second hydraulic valving assembly 76 is located near second end 70 of upper receiving tube 66. Second hydraulic valving assembly 76 consists of a third and fourth series of extremely thin washers and springs 77a and 77b, respectively, attached on either side of a second metallic ring 78 having a certain thickness and a plurality of holes drilled through it. In fact, first and second hydraulic valving assemblies 72 and 76, respectively, are constructed in the same manner and are interchangeable. Second hydraulic valving assembly 76 is attached to short rod 79 and secured at both ends by nuts 80 and 81.

Short rod 79 extends for some distance from second hydraulic valving assembly 76 before becoming detachably attached to second end 70 of upper receiving tube 66. A plurality of orifices 82 are located on upper receiving tube 66, below second metallic ring 78 and above second end 70 of upper receiving tube 66.

Upper section 62 is partially filled with hydraulic fluid. The precise amount of hydraulic fluid is unimportant as long as enough fluid completely covers first end 69 of upper receiving tube 66 and as long as upper section 62 is not completely filled with hydraulic fluid. Hydraulic fluid seeps through orifices 82 to fill the inner cavity of upper receiving tube 66.

Lower section 63 houses the same components as upper section 62. Generally, lower section 63 contains lower coil spring 83, lower rod 84, lower receiving tube 85, third hydraulic valving assembly 86, and fourth hydraulic valving assembly 87. The above items are connected to each other in the same manner as their counterparts housed in upper section 62. Finally, lower section 63 is also partially filled with hydraulic fluid in the same manner and generally to the same extent as upper section 62.

Because the damping mechanism contained in upper section 62 is generally similar to the mechanism contained in lower section 63, the process by which a compression is damped is the same for both mechanisms. Therefore, a detailed description of the damping cycle of only one damping mechanism—the one contained in upper section 62—will be described below.

When a compression force is exerted on upper section 62, upper receiving tube 66 moves up to receive upper rod 65 and second hydraulic valving assembly 76 moves toward first hydraulic valving assembly 72. As upper rod 65 moves into upper receiving tube 66, the mass of upper rod 65 inside upper receiving tube 66 displaces an amount of hydraulic fluid within upper receiving tube 66. This hydraulic fluid escapes the inner cavity of upper receiving tube 66 via second hydraulic valving assembly 76. The rest of the hydraulic fluid passes through first hydraulic valving assembly 72 and remains inside the inner cavity of upper receiving tube 66.

If passing through first hydraulic valving assembly 72, the hydraulic fluid first flows past first series of washers and springs 74a, snakes through the holes in first metallic ring 75, and exits through second series of washers and springs 74b. Once passed through first hydraulic valving assembly 72, the hydraulic fluid fills any space left inside the inner cavity of upper receiving tube 66 not already filled by upper rod 65.

If the hydraulic fluid escapes through second hydraulic valving assembly 76, then the hydraulic fluid first flows through third series of washers and springs 77a, snakes through the holes in second metallic ring 78, and then exits through fourth series of washers and springs 77b. After passing through second hydraulic valving assembly 76, the hydraulic fluid is expelled out of upper receiving tube 66 via orifices 82.

Hydraulic valving assemblies 72 and 76 are key components to the damping mechanism of upper section 62. In fact, the damping rate of the entire suspension is controlled through the rate by which hydraulic fluid is allowed to pass through each hydraulic valving assembly. The compression force is completely damped when it can no longer force upper receiving tube 66 into upper rod 65 any further.

As upper receiving tube 66 moves to receive upper rod 65, upper coil spring 64 is also compressed. After the external force has been completely damped, coil spring 64 provides the necessary counter force to return upper receiving tube 66 and upper rod 65 to their respective ready positions. As upper rod 65 exits upper receiving tube 66, hydraulic fluid refills the inner cavity of upper receiving tube 66 by passing through first hydraulic valving assembly 72, or orifices 82 and then second hydraulic valving assembly 76. When upper coil spring 64 has been returned to its ready position, it holds upper rod 65 and upper receiving tube 66 in their ready positions until upper section 62 experiences another compression force. Although the foregoing only describes the damping of an external force by upper section 62, the same series of action also apply to lower section 63. In fact, when a compression force is applied to the entire left suspension 12, the force is first damped by lower section 63. If lower section 63 cannot completely damp the compression force, then upper section 62 is used to damp out the remainder of the compression force.

As the present invention damps a compression force, an observer first sees lower telescoping cylinder 20 telescope into left center cylinder 18. If the compression force is not completely damped by the above telescoping action, left center cylinder 18 then telescopes into left upper telescoping cylinder 16. Note that, for the present invention, it is possible for a short period of time for one telescoping part to be in the expansion or rest stage of the damping cycle while the other telescoping part to be in the compression stage of the damping cycle.

The above description uses a spring, rod, and hydraulic assembly to damp shocks. However, it is important to note that the novel aspect of the present invention rests on the fact that the present invention has two independently telescoping segments used to absorb both large and small shocks. Thus, the actual internal damping mechanism used to achieve this double telescoping action is unimportant—that is, any conventional damping mechanism can be used as the internal damping mechanism for the present invention.

In addition to motorcycles, the present invention can be adapted for use on bicycles such as mountain bikes. Two suspensions can be attached to the mountain bike, one on each side of the front wheel, connecting the wheel axis to the steering column. Alternatively, a smaller version of the present invention can replace the bicycle's steering column so that only one suspension is needed to damp the shocks.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of providing shock absorption for a front suspension system of a wheeled vehicle having a single front wheel, said shock absorption method including the following steps:

first connecting a lower end of shock absorbers on both sides of said single front wheel;

second connecting an upper end of said shock absorbers to an upper clamp of said wheeled vehicle;

first telescopingly mating upper cylinders with center cylinders of said shock absorbers, said upper cylinders being secured to said upper clamp;

first compressing springs between said upper cylinders and said center cylinders in response to upward forces being applied to said single front wheel;

second telescopingly mating said center cylinders with lower cylinders of said shock absorbers, said lower cylinders being secured to an axle of said single front wheel; and second compressing springs between said center cylinders and said lower cylinders in response to said upward forces being applied to said single front wheel;

said first telescopingly mating being independent from said second telescoping mating.

2. The method of providing shock absorption for a front suspension system as provided in claim 1 further including:

first damping between said upper cylinders and said center cylinders and second damping between said center cylinders and said lower cylinders, said first damping being independent from said second damping.

3. The method of providing shock absorption for a front suspension system as provided in claim 2 including sealing said upper, center and lower cylinders to retain fluid therein;

first orifices restricting flow of said fluid inside said upper cylinder and said center cylinders to provide said first damping;

second orifices restricting flow of said fluid inside said center cylinders and said lower cylinders to provide said second damping.

4. The method of providing shock absorption for a front suspension system as provided in claim 3 wherein said center cylinders have center plates therein which separate an upper half of said shock absorber from a lower half of said shock absorbers.

5. The method of providing shock absorption for a front suspension system as recited in claim 1 further including:

upper rods and receiving tubes inside of and holding together said upper cylinders and said center cylinders during said first telescopingly mating step; and lower rods and receiving tubes inside of and holding together said center cylinders and said lower cylinder during said second telescopingly mating step.

6. The method of providing shock absorption for a front suspension system as recited in claim 5 further including:

first damping by first orifices in said upper receiving tubes restricting fluid flow therethrough; and second damping by second orifices in said lower receiving tubes restricting flow therethrough.

7. The method of providing shock absorption for a front suspension system as given in claim 1 wherein an upper half of said shock absorbers has different compressive strengths and damping forces from a lower half of said shock absorbers.

8. A motorcycle comprising:

a frame;

a seat attached to said frame;

a fuel tank attached to said frame;

a motor attached to said frame;

a rear wheel attached to said frame and connected to said motor;

a front wheel;

a suspension fork attached to said front wheel at a front end and attached to said frame near a second end, said fork having three cylinders on each side of each suspension fork, an upper cylinder attached to said frame, a lower cylinder attached to said front wheel and a center cylinder independently telescoping within said upper cylinder and said lower cylinder, said center cylinder providing two independently telescoping segments on each of said sides of said suspension fork to give independent shock absorbing action; and a handle bar attached to said second end of said suspension fork.

9. A front wheel suspension system for vehicles having a single front wheel, handle bars and a front axle, said front wheel suspension system for vehicles comprising:

a triple clamp adapted to be attached to said handle bars;

a steering stem attached generally perpendicular to said triple clamp;

a suspension for mounting on each side of said single front wheel and attached generally perpendicular to said triple clamp and parallel to said steering stem, said each side of said suspension having three cylinders, an upper cylinder attached on an upper end to said triple clamp, a lower cylinder attached to said front axle and a center cylinder independently telescoping within said upper cylinder and said lower cylinder, said center cylinder providing two independently telescoping movements on said each side of said suspension.

\* \* \* \* \*